Sept. 19, 1961 G. J. FEDERIGHI 3,000,195
DRINKING GLASS FROSTER
Filed June 5, 1959 3 Sheets-Sheet 2

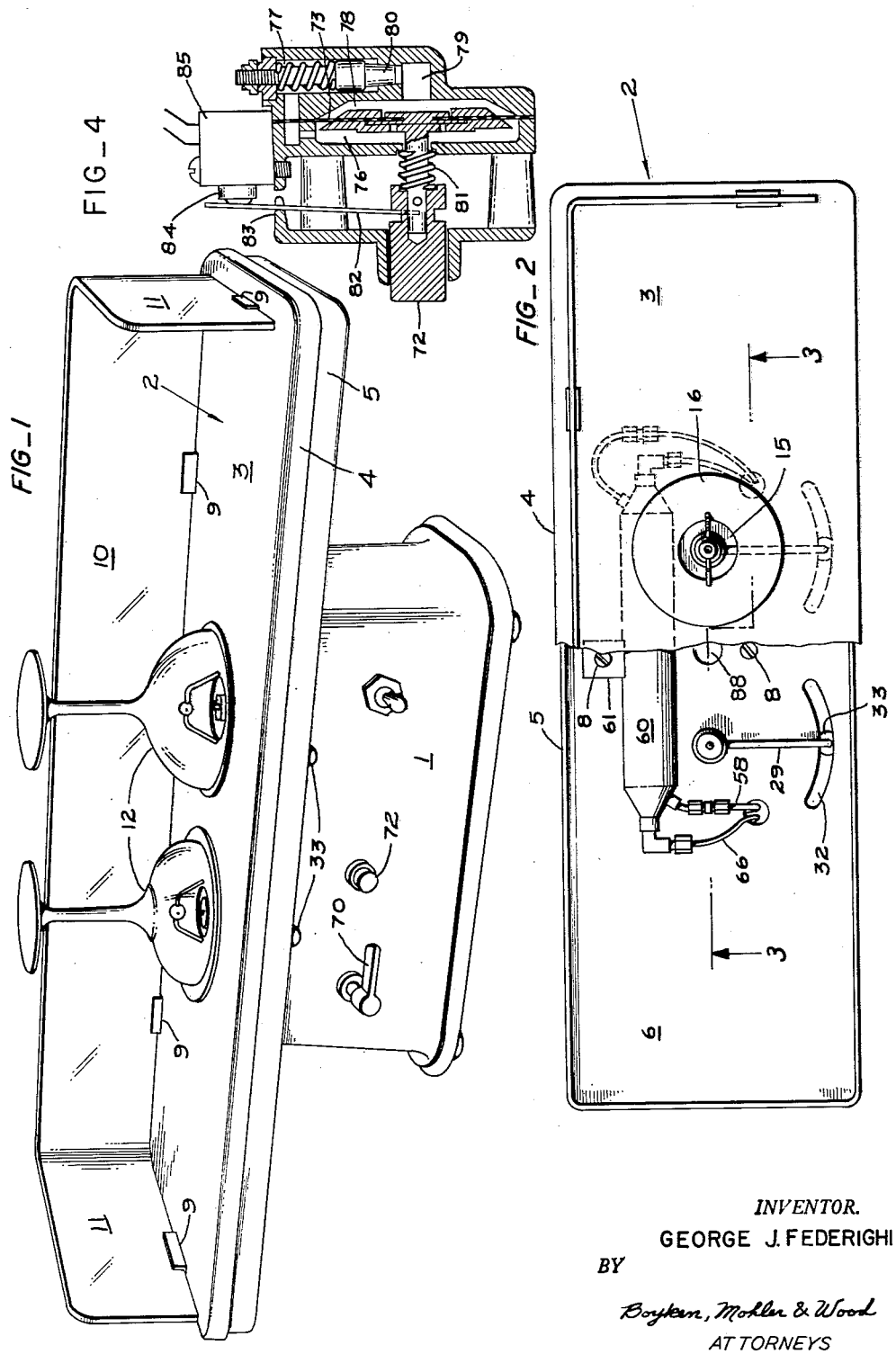

FIG_3

INVENTOR.
GEORGE J. FEDERIGHI
BY
Boyken, Mohler & Wood
ATTORNEYS

Sept. 19, 1961 G. J. FEDERIGHI 3,000,195
DRINKING GLASS FROSTER
Filed June 5, 1959 3 Sheets-Sheet 3
FIG _ 5
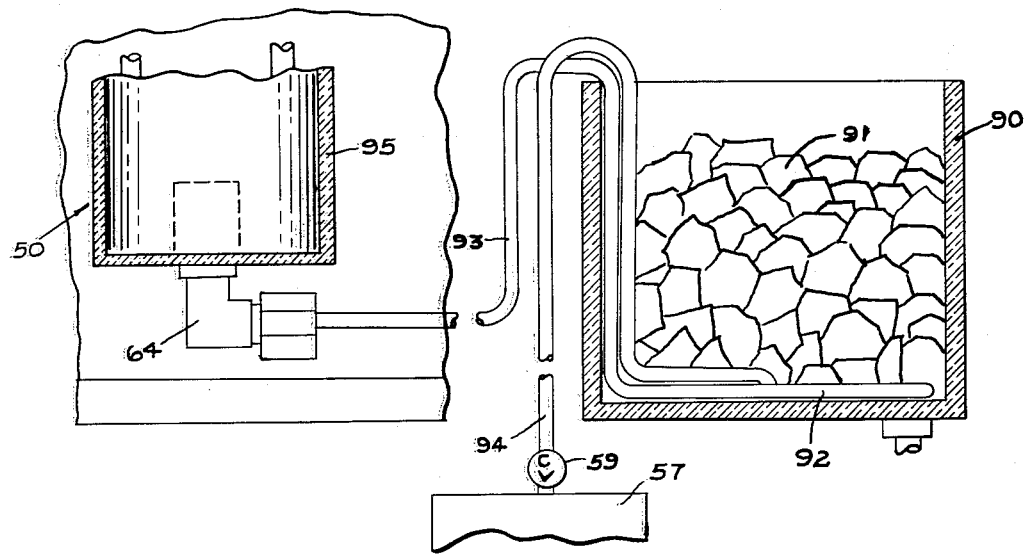
FIG _ 6
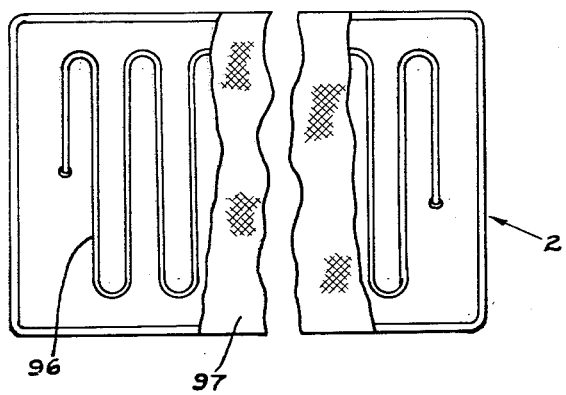
INVENTOR.
GEORGE J. FEDERIGHI
BY
Boyken, Mohler & Wood
ATTORNEYS

United States Patent Office 3,000,195
Patented Sept. 19, 1961

3,000,195
DRINKING GLASS FROSTER
George Joseph Federighi, 616 Teresita Blvd., San Francisco, Calif., assignor to Reuben S. Tice, Monterey, Calif.
Filed June 5, 1959, Ser. No. 818,348
14 Claims. (Cl. 62—373)

This invention relates to a drinking glass froster for cooling and for frosting the exteriors of glasses such as cocktail, champagne, and Pilsner type glasses, and others.

Heretofore, as shown in United States Letters Patents Nos. 2,587,075 and 2,749,715, issued to R. S. Tice on February 16, 1952, and June 12, 1956, respectively, the expansion of liquid $CO_2$ into inverted drinking glasses for cooling and frosting the same has been practiced.

One of the objects of the present invention is the provision of improvements in the heretofore practiced methods and devices for cooling and frosting drinking glasses by the use of liquid $CO_2$, to insure greater consistency in uniformly cooling and frosting glasses irrespective of differences in the temperatures at the point of expansion of the liquid $CO_2$ into the glasses and the source of the liquid $CO_2$.

Another object of the invention is the provision of structure that enables the safe frosting of drinking glasses by the expansion of liquid $CO_2$ into such glasses without manually or mechanically holding the glasses in place during such injection.

A still further object is the provision of a glass cooler and froster that is adapted to automatically expand liquid $CO_2$ under pressure into drinking glasses for a predetermined uniform time after such expansion has commenced, thereby enabling the operator to perform other duties during the cooling and frosting of the glasses.

Another object of the invention is provision for cooling liquid $CO_2$ to its optimum operating temperature for effecting the frosting of glasses by means of cold water, ice, exhaust $CO_2$ gas from the frosting cycle or any other equivalent means of cooling the supply system.

A further object of the invention is the provision of a glass cooler and froster that includes means for conducting liquid $CO_2$ to a point or points of expansion into glasses for cooling and frosting them, and which cooler and froster is provided with means for maintaining an effective supply of liquid $CO_2$ at said point or points irrespective of the fact that the atmospheric temperature at and adjacent to said point or points is above that at which the liquid $CO_2$ will vaporize.

In explanation of the above, a normal installation of a glass cooler and froster of the type hereinafter disclosed, in a commercial establishment, requires the cooler and froster to be in a room where the atmospheric temperature may run to 75° F. and higher, whereas the liquid $CO_2$ for the cooler may be in the basement where the temperature may be approximately 60° F. A conduit leading from the tank of liquid $CO_2$ to the cooler will necessarily be exposed, at the cooler, to a temperature of 75° F. and will pick up heat rapidly when no liquid $CO_2$ is being discharged at the cooler, thereby causing a marked pressure differential over that of the $CO_2$ cylinder or tank pressure and the liquid $CO_2$ contained therein. This temperature variance and resulting pressure differential becomes so critical that it forces the liquid $CO_2$ back into the supply cylinder so that only $CO_2$ gas remains in the supply line.

As a result of the above condition, when a valve at the cooler is opened, only gas will be ejected into the glass until it is exhausted from the supply line and the liquid $CO_2$ reaches the cooler.

In the present invention the cooler and froster and the supply cylinder of liquid $CO_2$ may be maintained in the same positions as heretofore, but provision is made for insuring a supply of liquid $CO_2$ at the discharge point or points of the cooler so that once the glass or glasses to be cooled are in proper position over such point or points, and the operator opens the valve to permit the discharge of the liquid $CO_2$, the glass or glasses will be cooled and uniformly frosted on their outer surfaces within four seconds time.

Other objects and advantages will appear in the description and drawings.

In the drawings,

FIG. 1 is an isometric view of a device for frosting cocktail glasses.

FIG. 2 is a top plan view of the device of FIG. 1 partially broken away to show structure below the top platform of the device.

FIG. 3 is a vertical sectional view as seen along line 3—3 of FIG. 2.

FIG. 4 is an enlarged vertical sectional view showing a timer adapted to be employed in the combination.

FIG. 5 illustrates a modification of the means shown in FIG. 3 for cooling the $CO_2$ adjacent to the point of expansion.

FIG. 6 illustrates a still further modification of the means shown in FIGS. 3 and 5 for cooling the $CO_2$.

In detail, a housing 1 is provided, which housing supports a hollow, horizontally elongated and horizontally disposed platform 2 thereon, said platform having a top wall 3 that has depending flanges 4 around its edges extending over the upwardly extending flanges 5 of the lower wall 6 of said platform. The upper wall 3 is preferably supported on the upper edges of the flanges 5. Said lower wall and flanges 5 are preferably integrally formed from plastic material while the top wall and its flanges may be formed of stainless steel or similar material, although any suitable material may be used in either instance.

The housing 1 itself has a top wall 7 to which the lower wall 6 of platform 2 may be secured by sheet metal screws 8 (FIG. 2).

In the form of the invention illustrated in the drawings, the platform 2 is generally oblong and the housing 1, therebelow, is elongated in the same direction but is shorter and is centrally positioned between the ends of the platform.

Upstanding generally U-shaped clips 9 that are secured to the upper wall 3 of platform 2 function to releasably support a vertically disposed shield 10 along one of the longitudinally extending edges and the end edges of said upper wall. This shield includes wings 11 that extend along said ends of the upper wall. Shield 10 including its wings 11 are preferably of transparent plastic material with the portion between the wings extending along the front side of the device, or the side that is opposite to the operator manipulating the cooler.

In using the words "front," "rear," and words of similar import, it is to be understood that the "rear" side of the device is the side at which the operator stands, while the front side is the side at which the customer may stand.

The shield 10 and wings 11 not only may function as a means disposed between the operator and persons at the side of the device opposite to the operator to prevent such persons from having too ready access to the glasses being frosted, but they also prevent accidental displacement of the glasses over the front edge and ends of the device. As seen in FIG. 1 the spaces between the wings 11 and the glasses 12 that are in frosting position are ample for holding a supply of glasses to be frosted.

The top wall 3 of the platform is formed with several circular openings 15 (FIG. 2). The marginal portion around each opening extends slantingly downwardly to the opening (FIG. 3) and an annular rubber or rubber-like sheet 16 secured on the upper surface of the slanted marginal portion around each opening is similarly slanted, and forms a relatively soft seat against which the rim of an inverted glass 12 is adapted to be supported in sealing relation. The inclined surface of the seat facilitates the making of a seal between the rim of the glass and the seat 16 even if the vertical axis of the glass is not quite coaxial with the axis of the opening 15.

A generally ball-like deflector 17 is coaxial with the axis of each opening 15 and is supported in a position spaced above the platform 2 and approximately centrally within an inverted glass 12 by a pair of wire legs 18. Legs 18 are preferably in a common plane extending longitudinally of the platform and are secured at their lower ends to the top wall 3 of the platform at opposite sides of each opening 15. Each pair of legs 18 extend convergently upwardly from opposite sides of each opening 15 to opposite sides of each ball 17, and then into recesses formed in two opposite lateral sides of each ball into which recesses the upper ends of the legs are secured.

Each ball deflector 17 is centrally formed with an open ended vertical passageway 19 that is enlarged at its lower half by a counterbore 20. Relatively small diameter horizontally extending coaxial, open ended passageways 21 open into the upper end of said counterbore, which passageways extend at right angles to the recesses in which the upper ends of the legs 18 are secured.

Within the opening 15, and coaxial therewith, is an upwardly directed discharge opening 22 of a discharge nozzle 23.

With a deflector and nozzle, as described and shown, some of the liquid $CO_2$ that is ejected upwardly from the discharge opening will be deflected laterally and also upwardly by engagement with the rounded outer surface of ball 17 around the lower open end of counterbore 20. Other of the liquid $CO_2$ will pass into the counterbore, and will pass out of the latter through the smaller diameter vertical passageway 19 and through the laterally directed passageways 21, but at a velocity that is less than that of the deflected $CO_2$. The result of this distribution and deflection of liquid $CO_2$ is that a slight partial vacuum is created in the bottom of the glass 12 above the dot-dash line 25 while a slight pressure is created below the line 25, whereby the glass will be held against the seat 16 instead of being blown off the seat.

The liquid $CO_2$ expanded into the glass vaporizes and cools the glass to a degree that within three to four seconds time the exterior surface of the glass is covered with a uniform frosting due to condensation of the water in atmospheric air thereon. The inside of the glass is dry and clean when the outside is frosted, and the stem, of course, will remain dry and unfrosted.

In the present system each nozzle 23 comprises a vertically extending member 26 exteriorly threaded at opposite end portions and formed with a radially projecting flange 27 intermediate said end portions that may be faced for engagement with a wrench. This member 26 is formed with a through bore in which may be positioned a fluted stem 28 having a pointed upper end adapted to extend into the discharge opening of nozzle 23. The slanted outer sides of the pointed upper end of the stem 28 and the inner sides of the discharge opening may be complementarily formed so that the sides of the stem at the pointed upper end thereof would seat against the sides of the opening if the nozzle 24 were screwed downwardly sufficiently.

The threads on the upper end of each member 26 threadedly support the nozzle 23 thereon and a laterally projecting handle 29 is secured to the nozzle 23 and projects laterally therefrom and then downwardly at its outer end to extend through an arcuate slot 32 (FIG. 2) formed in the lower wall of the platform 2. A finger engageable knob 33 below the platform 2 and adjacent to the rear side of the housing 1 is adapted to be manually actuated for regulating the nozzle. Thus the operator at the rear side of the housing may readily regulate the size of the discharge opening, which size may vary with the size and shape of the glasses being cooled, or for other reasons. Normally the adjustment being once made for glasses of one size and shape, it is not necessary to re-adjust the opening 22.

An O-ring between member 26 and the nozzle 23 adjacent to the flange 27 prevents the escape of $CO_2$ past the two members at the lower end of the nozzle.

Within the housing 1 below its upper wall are the valve structures for passing liquid $CO_2$ to the nozzles 23 for discharge from the latter.

Each valve structure comprises an upper body portion 35 that is formed with a downwardly opening recess 36 in its lower side. This recess 36 cooperates with an upwardly opening recess 37 in the upper part of the lower body portion 38, the said portions 35, 38 being threadedly secured together so that the recesses 36, 37 are coaxial and combine to form a single chamber within the body portions 35, 38 (FIG. 3).

A vertical passageway 40 extends through the upper body portion 38 and is slightly eccentric relative to the bore in member 26 in which the fluted stem 28 is positioned so as to always register with one of the passageways defined by one of the flutes and the bore in member 26. An annular downwardly projecting seat 41 is formed on the body portion 35 around the lower end of passageway 40 for making a sealing engagement with the upper surface of a valve member 42.

Around the valve member 42 is a coil spring 39 that reacts between a radially outwardly projecting flange on said member and a shoulder in the recess 37 for yieldably urging the valve upwardly into seating relation relative to the seat 41.

A fluted soft iron armature 43 is connected with the valve member 42 and extends downwardly below the latter within recess 37, the lower end of said armature being spaced above the lower end of recess 37 when the valve member 42 is seated against seat 41.

An electrical coil 44 surrounds the member 38 and is secured in position around the latter and within a coil housing 45 by a nut 46 that is on a downwardly extending externally threaded projection 47 that projects through the lower wall of said housing. Thus the valve becomes a solenoid actuated valve. Upon energizing the coil 44 the valve member 42 is opened and will stay open until the current to the coil is discontinued, when spring 39 will automatically close the valve.

Opening into one side of the upper body 35 of each valve structure is a passageway 49 that communicates with the recess 36 around valve member 42.

Between the upper body members 35 of the valve structures is a receptacle 50. The upper end portion of this receptacle is about even with the passageways 49 that open into the upper valve body portions 35, and a tube 51 is secured at one end in each passageway 49 and at its opposite end within an opening in the side wall 52 of receptacle 50 closely adjacent to the upper wall 53 of said receptacle.

A pair of dip tubes 54 secured to opposite sides of the receptacle 50 within the latter extend from points adjacent to the bottom wall 55 to the tubes 51 and said dip tubes extend at their upper ends laterally into the tubes 51 in spaced relation to the sides of said tubes 51, the space between said ends and said sides being filled with solder securing said ends within tubes 51. A small vent opening 56 is formed in tubes 54 at their bends in the outer sides of the bends.

In the normal installation, a tank 57 of liquid $CO_2$ is usually positioned at a point remote from the housing 1, usually in the basement or below the floor of the bar. A high pressure tube 58, preferably of about 1/8" diameter and of "nylon," is secured at one end thereof to the upper end of a siphon tube that extends to the bottom of the tank, and that includes a check valve 59 at its upper end, and the gas pressure on the liquid $CO_2$ within the tank is adapted to force the liquid $CO_2$ through the tube when the latter is open to the flow of liquid $CO_2$.

In the present instance the tube or pipe 58 extends through the housing 1 to the platform 2. Between the upper wall 3 and lower wall 6 of the platform is a horizontally elongated heat exchanger in the form of a horizontally extending tank 60 that is secured to the lower wall 6. Preferably a recess is formed in the wall 7 to receive the lower side of the tank, and a clamping member 61 (FIG. 2) may be secured by one of the screws 8 in a position extending partially over the tank 60 to releasably hold it in place.

The tube 58 connects with one end of a coil 62 (FIG. 3) that extends through the tank and the opposite end of the coil is connected with a tube 63 that, in turn, connects with one leg of an elbow fitting 64, the other leg of which is secured to and opens upwardly in the lower portion of receptacle 50 through an opening in bottom wall 55 of the latter.

The bottom wall 55 may be formed with a passageway 75 communicating with the passageway through fitting 64, and an upstanding wall around the upper end of said passageway is adapted to receive a gravity actuated ball valve 65 for closing said passageway against return of liquid $CO_2$ from the receptacle into the tube 63.

From the foregoing description it will be seen that the tube 58, coil 62, tube 63, receptacle 50, tubes 54, recess 36, passageway 40 and the passageway through member 26 to the discharge opening in nozzle 23 form a conduit between the tank 57 and the discharge opening 22 of each discharge nozzle 23.

A copper tube 66 connected at one end with a source of cold water under pressure, preferably refrigerated to approximately 40° F., extends to one end of tank 60 and opens into the latter, and a pipe or tube 67 connects with and opens at one end thereof into the opposite end of tank 60. This tube 67 extends downwardly into the housing 1 and extends around the receptacle 50 in heat transfer relation to the walls of the latter in the form of a coil 68. Tube 67 vents to the sewer or to any other suitable drain, and a valve 69 in tube 66 controls the flow of water through tank 60 and tube 67. Obviously this valve could be in tube 67.

A valve handle 70 (FIG. 1) is connected with valve 69 for actuating the latter, said handle being at the rear side of the housing 1 and visible for access to the hand of the operator.

Suitably secured to the rear side of housing 1, and within the latter, is a conventional switch and timer combination as seen in FIG. 4.

The switch and the timer connected thereto for actuation thereof is in an electrical circuit 71 that includes the solenoid coils 44.

This timer-switch combination comprises a push button 72 (FIGS. 1 and 4) that extends through the rear wall of housing 1, and which button is connected with a flexible diaphragm 73 contained within a chamber dividing the latter into two compartments 76 and 78. Compartment 76 may be vented into a valve chamber 77 while compartment 78 communicates with a passageway 79 in which is an adjustable needle valve 80 in valve chamber 77 adapted to control the flow of air from compartment 76 into compartment 78. A coil spring 81 reacts against button 72 to yieldably urge it outwardly for exhausting air from compartment 76 and passing it to compartment 78. The spring 81 will be compressed during this movement, and when the pressure on the push button is removed the spring will drive the latter back to its outwardly projecting position as fast as the valve 80 will permit air to enter compartment 78. The time for accomplishing this movement can be regulated fairly accurately, and valve 81 is adjusted to enable completion of the reverse movement within substantially four seconds time.

Connected with the push button is a yoke plate 82 having a yoke at one end that connects with the push button and extending upwardly past a fulcrum element 83 and over a spring urged button 84 that actuates a switch in the box 85. This switch may be a conventional mercury switch that is in the circuit 71 and which is in a normally open position when the switch button 84 is depressed and the push button 72 is out or in its fully projecting position. Upon pushing the push button 72 forwardly or toward a depressed position, the yoke plate 82 will fulcrum about element 83 to release the switch button for outward movement of the latter under spring tension and to thereby close the circuit 71. Approximately four seconds after the button 72 is released it will be restored to its outwardly projecting original position and the switch in box 85 will open to break the circuit.

Upon the circuit 71 being closed the solenoid core 43 of each valve assembly will be moved down to open the valve 42 for ejection of liquid $CO_2$ into the glasses 12 that are over the discharge nozzles, and said valves 42 will automatically be closed by springs 39 as soon as the coils 44 are de-energized.

The receptacle 50 into which the dip tubes 54 extend is a high pressure cylinder that is preferably adapted to hold approximately four cubic inches of liquid $CO_2$ where approximately one cubic inch is needed to frost one glass. Obviously the cylinder may be of any capacity, but this example is found to be successful in most operations.

Since a small amount of $CO_2$ gas may collect in the upper portion of the receptacle, the small vent openings 56 in the bends of the dip tubes enable this gas to pass out with liquid $CO_2$ that is moved through the dip tubes upon the valves 42 being opened, thus leaving the receptacle filled with liquid $CO_2$, a condition that is very important to the accomplishment of the desired results. Thus the receptacle 50 which may be called a "compensator," allows for clearing of gas in the supply line and supports a frosting operation until such time as the liquid $CO_2$ from the tank 57 in the basement delivers a constant flow of liquid $CO_2$ to the valves 42. Regardless of how long a time interval elapses when the froster is not being operated, the compensator will deliver liquid $CO_2$ to the valves 42 for immediate frosting of the glasses. Thus with the valves 42 discharging a regulated supply of liquid $CO_2$, an even, uniform frost is produced on the exteriors of the glasses within at least substantially four seconds each time the froster is actuated.

The heat transfer means, such as the water cooling system, preferably maintains the liquid $CO_2$ in the conduit that includes the receptacle 60 and the coil 62 at a temperature of close to that of the water in the exchanger. At this temperature the liquid $CO_2$ will remain in the liquid phase, and gas will be converted to the liquid phase.

It is seen that the $CO_2$ gas that is formed within the glasses 12 is free to be discharged into the hollow platform and this cool gas assists in cooling the conduit that conducts the liquid $CO_2$ to the cocktail glasses, which is highly desirable, and this gas also passes through the openings 88 into housing 1.

The importance of the creation of a slight partial vacuum in the upper portions of the glasses is believed to be obvious. Otherwise the expansion of liquid $CO_2$ into the glasses under pressure would unseat the glasses, making it necessary for the operator to hold them down. As it is, the injection of the liquid $CO_2$ may be done while the operator is away from the cooler performing another operation, without danger of the glasses being unseated. The ultimate results desired are the rapid cooling of the glasses and the rapid, uniform frosting of their outer sides, leaving the glasses dry on the inside and dry for handling, since the frost is restricted to the outer sides of the bowls and is preferably kept relatively thin so as not to produce a noticeably wet surface when the frost melts.

A feature of the present invention that should be emphasized at this point, is the fact that heretofore, in say a 50 lb. tank of liquid $CO_2$, it has not been possible to utilize the entire quantity of $CO_2$. After approximately 35 to 40 lbs. has been used, gas is discharged instead of liquid, and a new tank is required, even though approximately 15 lbs. of liquid $CO_2$ remain in the old tank.

FIGS. 5 and 6 show two other means than the heat exchanger of FIG. 3 for not only insuring a complete utilization of the liquid $CO_2$ in the tank 57, but which substantially eliminates any objectionable noise at the discharge nozzles during expansion of the liquid $CO_2$ by reducing the pressure at the discharge points to almost half that which would exist where the liquid $CO_2$ at said points is at approximately 55° to 66° F.

In commercial establishments where the glass coolers are used, it is customary to have a container 90 (FIG. 5) of cracked ice 91 adjacent to the cooler. In such instances the heat exchanger 60 shown in FIG. 3 may be omitted, and the "nylon" high pressure conduit from the tank 57 may pass through this container 90 and then directly to the fitting 64 that opens into the receptacle. The portion of the $CO_2$ conduit that passes through the container 90 may be in the form of a flat, spiral coil 92 positioned on the bottom of the container with the ice 91 on top of the coil so that the presence of the coil in no way interferes with the operator in using the ice. Length 93 of the tube extends from the coil 92 to the fitting 64 while length 94 extends from the coil to the tank 57.

In this manner the liquid $CO_2$ in receptacle 50 which may be heat insulated by a covering of insulation material 95, if desired, will be maintained at approximately the temperature of melting ice, or around 38° to 40° F.

FIG. 6 shows a still further modification in which parallel lengths 96 of the $CO_2$ delivery tube, connected by return bends at their ends, are positioned within the platform 2 in place of the coil and heat exchanger of FIG. 3, and a conventional thermostatically controlled electric cooling blanket 97 is positioned over the lengths 96 to maintain the $CO_2$ at the lowered temperature. The tube 96 is connected at one end with tank 57 and at the other end with the fitting 64.

The important part of the foregoing cooling step is that the temperature of the $CO_2$ at the cooler be such that any gas in the $CO_2$ line that would otherwise reach the discharge nozzles in gaseous form, for any reason, will be converted into liquid $CO_2$ for expansion to gaseous form within the glasses 12, and it is highly desirable that the pressure at the discharge nozzles be sufficiently low to eliminate an objectionable hissing noise upon expansion.

By so cooling the $CO_2$ to its optimum operating temperature for the frosting operation, as above described, the gas that otherwise would be ejected from the discharge nozzles is converted into liquid and is delivered in liquid form from the receptacle 50 to the discharge nozzles at each frosting operation. Thus the $CO_2$ in tank 57 may be completely utilized.

The claims appended hereto are intended to cover all changes and modifications of the examples of the invention herein chosen for purposes of the disclosure, which do not constitute departures from the spirit and scope of the invention.

I claim:

1. A drinking glass froster comprising: a support having an annular supporting surface engageable with the rim of a drinking glass for making a sealing contact with said rim around the latter, a conduit for liquid $CO_2$ under pressure adapted to be connected with a source of liquid $CO_2$ under pressure and having a discharge outlet opening into the space adapted to be enclosed by such glass, said conduit including an enlarged chamber adjacent to said outlet adapted to hold a supply of said liquid $CO_2$ and to form a trap for $CO_2$ gas that may be formed in the portions of said conduit extending away from said chamber, means within said chamber for conducting liquid $CO_2$ therein past the gas adapted to be trapped therein to said outlet opening whereby liquid $CO_2$ will be ejected into said area upon opening said conduit to flow of liquid $CO_2$ to said outlet opening, and valve means in said conduit between said chamber and said outlet opening for opening and closing said conduit to flow of said liquid $CO_2$ from said first mentioned means to said outlet opening, means for cooling $CO_2$ in the portion of said conduit adjacent to and connected with said chamber for passage of liquid $CO_2$ into said chamber from said source at approximately 55° F. for preventing vaporization of liquid $CO_2$ delivered to said chamber.

2. A drinking glass froster comprising: a support having an annular supporting surface engageable with the rim of a drinking glass for making a sealing contact with said rim around the latter, a conduit for liquid $CO_2$ under pressure adapted to be connected with a source of liquid $CO_2$ under pressure and having a discharge outlet opening into the space adapted to be enclosed by such glass, said conduit including an enlarged chamber adjacent to said outlet adapted to hold a supply of said liquid $CO_2$ and to form a trap for $CO_2$ gas that may be formed in the portions of said conduit extending away from said chamber, means within said chamber for conducting liquid $CO_2$ therein past the gas adapted to be trapped therein to said outlet opening whereby liquid $CO_2$ will be ejected into said area upon opening said conduit to flow of liquid $CO_2$ to said outlet opening, and valve means in said conduit between said chamber and said outlet opening for opening and closing said conduit to flow of said liquid $CO_2$ from said first mentioned means to said outlet opening, means for cooling $CO_2$ in said chamber to approximately 55° F. for preventing vaporization of liquid $CO_2$ in said chamber.

3. A drinking glass froster comprising a support for engaging the rim of an inverted drinking glass and an upwardly directed nozzle spaced within said support for discharge of liquid $CO_2$ into the area enclosed by such glass, a conduit for liquid $CO_2$ connected with said nozzle and extending therefrom to a source of liquid $CO_2$ under pressure at a point remote from said nozzle for supplying liquid $CO_2$ to said nozzle for discharge therefrom, said conduit including a chamber adjacent to said nozzle and a check valve positioned therein to prevent return flow of liquid $CO_2$ from said chamber toward said source, valve means in the portion of said conduit between said chamber and said nozzle for opening and closing said portion to flow of liquid $CO_2$ from said chamber to said nozzle, said last mentioned portion connecting with the upper part of said chamber and said check valve being at the lower part of said chamber, and an open ended duct within said chamber extending from the lower part of said chamber into said portion at the upper part of said chamber for conducting liquid $CO_2$ from said chamber to said valve means in the event of the conversion of some of the liquid $CO_2$ in said conduit adjacent to said valve means and chamber into gas whereby liquid $CO_2$ will be passed from said chamber through said duct to said valve means for passage to said nozzle upon opening said valve means.

4. A drinking glass froster comprising a support for engaging the rim of an inverted drinking glass and an upwardly directed nozzle spaced within said support for discharge of liquid $CO_2$ into the area enclosed by such glass, a conduit for liquid $CO_2$ connected with said nozzle and extending therefrom to a source of liquid $CO_2$ under pressure at a point remote from said nozzle for supplying liquid $CO_2$ to said nozzle for discharge therefrom, said conduit including a chamber adjacent to said nozzle and a check valve positioned therein to prevent return flow of liquid $CO_2$ from said chamber toward said source, valve means in the portion of said conduit between said chamber and said nozzle for opening and closing said portion to flow of liquid $CO_2$ from said chamber to said nozzle, said last mentioned portion connecting with the upper part of said chamber and said check valve being at the lower part of said chamber, and an open ended duct within said chamber extending from the lower part of said chamber into said portion at the upper part of said chamber for conducting liquid $CO_2$ from said chamber to said valve means in the event of the conversion of some of the liquid $CO_2$ in said conduit adjacent to said valve means and chamber into gas whereby liquid $CO_2$ will be passed from said chamber through said duct to said valve means for passage to said nozzle upon opening said valve means, a relatively small opening formed in said duct adjacent to the upper end thereof for entrainment of any $CO_2$ gas that may accumulate in the upper part of said chamber with liquid $CO_2$ passing through said duct into said portion.

5. A drinking glass froster comprising: a substantially horizontally positioned support having an annular supporting surface for supporting an inverted drinking glass thereon in substantially sealing contact with said surface, a conduit for liquid $CO_2$ under pressure having an upwardly directed discharge outlet coaxial with said surface at one end of said conduit and adapted to be connected with a source of liquid $CO_2$ for supplying the latter to said outlet, valve means in said conduit adjacent to said outlet for opening and closing said conduit to flow of liquid $CO_2$ to said outlet, deflector means spaced over said outlet formed with a vertically extending open ended passageway coaxial with said outlet and laterally extending open ended ducts extending away from said passageway in communication therewith at one of their ends and opening laterally outwardly of said deflector means at their opposite ends, said passageway being of a lesser diameter at its upper end than at its lower end, whereby a structure is provided adapted to deflect and to pass therethrough liquid $CO_2$ discharged from said outlet to produce a partial vacuum in the upper portion of the space within such inverted glass when the latter is positioned on said supporting surface.

6. A drinking glass froster comprising: a horizontally disposed platform formed with an opening therein over which an inverted drinking glass is adapted to be positioned with its rim supported on the said platform around said opening, an upwardly directed discharge nozzle spaced within said opening for discharge of liquid $CO_2$ into the area enclosed by such glass, a conduit for liquid $CO_2$ connected with said nozzle for conducting liquid $CO_2$ to the latter under pressure from a remote source, said conduit including a condenser disposed below said platform and adjacent to said opening and within a space communicating with said opening, whereby $CO_2$ gas ejected from said nozzle and into said area will pass through said opening from said area to the exterior of said condenser for cooling the latter upon discharge of liquid $CO_2$ from said nozzle into said area when such glass is supported on said platform and over said opening.

7. A drinking glass froster comprising: a horizontally disposed platform formed with an opening therein over which an inverted drinking glass is adapted to be positioned with its rim supported on the said platform around said opening, an upwardly directed discharge nozzle spaced within said opening for discharge of liquid $CO_2$ into the area enclosed by such glass, a conduit for liquid $CO_2$ connected with said nozzle for conducting liquid $CO_2$ to the latter under pressure from a remote source, said conduit including a condenser disposed below said platform and adjacent to said opening and within a space communicating with said opening, whereby $CO_2$ gas ejected from said nozzle and into said area will pass through said opening from said area to the exterior of said condenser for cooling the latter upon discharge of liquid $CO_2$ from said nozzle into said area when such glass is supported on said platform and over said opening, a housing spaced below said platform and nozzle and positioned below said condenser, whereby said condenser is confined between said platform and said housing, and said conduit extending from said condenser into said housing and then to said nozzle, valve means in the portion of said conduit that is within said housing for opening and closing said conduit to flow of liquid $CO_2$ from said last mentioned portion to said nozzle.

8. A drinking glass froster comprising: a source of liquid $CO_2$ under pressure, a support engageable with the rim of a drinking glass, a conduit for liquid $CO_2$ connected with said source and having a discharge aperture opening into the space adapted to be enclosed by said glass, when the latter is on said support, valve means in said conduit adjacent to said outlet for opening and closing said conduit to flow of liquid $CO_2$ to said outlet, manually actuatable means for opening said valve means and automatically actuatable means for closing said valve means a predetermined period of time after manual actuation of said manually actuatable means whereby the degree of frosting of said glass may be uniformly controlled free from the attention of an operator.

9. A drinking glass froster comprising: a horizontally disposed annular support having a central opening and extending slantingly upwardly from said opening to provide an inclined annular seat against which the annular rim of a drinking glass is adapted to be supported, said support being of relatively soft, rubber-like material to form a close sealing contact with such rim, an upwardly directed discharge nozzle spaced within said opening to provide a passageway around said nozzle for passage of $CO_2$ gas from above said seat to below the latter, a conduit for liquid $CO_2$ connecting said nozzle with a source of liquid $CO_2$ at a remote point, valve means in said conduit for opening and closing said conduit to flow of liquid $CO_2$ to said nozzle for discharge from the latter into the space adapted to be enclosed by a glass on said seat, a compartment below said support into which the gas formed in said space by vaporization of liquid $CO_2$ discharged thereinto is adapted to pass through said opening in said support, said conduit extending through said compartment and a condenser including a water chamber in said compartment around the portion of the conduit extending therethrough for liquifying any $CO_2$ gas that may pass into said portion.

10. A drinking glass froster comprising: a horizontally elongated compartment having an upper wall, a lower wall, and side walls, a plurality of openings formed in said upper wall and an annular seat around each of said openings for seating against the annular rim of a drinking glass, an upwardly directed discharge nozzle spaced within each opening and a branch conduit connected with each nozzle for conducting of liquid $CO_2$ under pressure thereto, a valve in each branch conduit adjacent to each nozzle actuable for opening and closing each branch conduit to flow of liquid $CO_2$ to each nozzle, a main conduit connecting each branch conduit with a source of liquid $CO_2$ under pressure, said main conduit extending through said compartment for cooling by vaporized $CO_2$ gas passing through said openings around said nozzle and into said compartment upon discharge of liquid $CO_2$ into glasses over said nozzles, a housing below said compartment in which the valves in said branch conduits are located, a container for liquid $CO_2$ from said main conduit disposed within said housing and means extending into said chamber for supplying said branch conduits with liquid $CO_2$ from said container.

11. A drinking glass froster comprising; an annular support having a central opening formed therein and which support is adapted to seat against the rim of an inverted drinking glass on said support, an upwardly directed discharge nozzle in said opening, a source of liquid $CO_2$ under pressure, a conduit connecting said source with said nozzle, heat transfer means in heat transfer relation to said conduit adjacent to but spaced from said nozzle for cooling the $CO_2$ in said conduit adjacent to said nozzle to a temperature below that of the vaporizing temperature of $CO_2$ in said conduit between said source and said heat transfer means.

12. A drinking glass froster comprising; an annular support having a central opening formed therein and which support is adapted to seat against the rim of an inverted drinking glass on said support, an upwardly directed discharge nozzle in said opening, a source of liquid $CO_2$ under pressure, a conduit connecting said source with said nozzle, heat transfer means in heat transfer relation to said conduit adjacent to but spaced from said nozzle for cooling the $CO_2$ in said conduit adjacent to said nozzle to a temperature of approximately 40° F.

13. A drinking glass froster comprising; an annular support having a central opening formed therein and which support is adapted to seat against the rim of an inverted drinking glass on said support, an upwardly directed discharge nozzle in said opening, a source of liquid $CO_2$ under pressure, a conduit connecting said source with said nozzle, heat transfer means in heat transfer relation to said conduit adjacent to but spaced from said nozzle for cooling the $CO_2$ in said conduit adjacent to said nozzle to a temperature of approximately 40° F., and the portion of said conduit between said last mentioned means and said discharge nozzle including a receptacle adapted to hold a supply of liquid $CO_2$ cooled by said means for delivery from said receptacle to said nozzle.

14. In combination with a container having ice therein, a glass froster adjacent to said container provided with an annular seat for seating of the rim of an inverted drinking glass thereon, an upwardly directed nozzle opening through said seat into the space adapted to be enclosed by such glass, a supply of liquid $CO_2$ under pressure, a high pressure tube extending from said source through said container for cooling by the ice therein and to said nozzle, and valve means in said conduit adjacent to said nozzle for opening the conduit to discharge of liquid $CO_2$ from said nozzle into said space.

References Cited in the file of this patent

UNITED STATES PATENTS

| | | |
|---|---|---|
| 2,145,130 | Reich | Jan. 24, 1939 |
| 2,379,215 | Brinkmann | June 26, 1945 |
| 2,510,140 | Rausch | June 6, 1950 |
| 2,587,075 | Tice | Feb. 26, 1952 |
| 2,749,715 | Tice | June 12, 1956 |